US006879647B1

(12) United States Patent
Myers

(10) Patent No.: US 6,879,647 B1
(45) Date of Patent: Apr. 12, 2005

(54) RADIO RECEIVER AM-MSK PROCESSING TECHNIQUES

(75) Inventor: Michael H. Myers, Poway, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 605 days.

(21) Appl. No.: 09/675,941

(22) Filed: Sep. 29, 2000

(51) Int. Cl.[7] .............................................. H03D 3/00
(52) U.S. Cl. ...................................... 375/336; 375/316
(58) Field of Search ................................. 375/323, 324, 375/326, 329, 336, 344, 316

(56) References Cited

U.S. PATENT DOCUMENTS

| | | | | |
|---|---|---|---|---|
| 4,835,792 A | * | 5/1989 | Davarian | ..................... 375/324 |
| 4,942,592 A | | 7/1990 | Leitch et al. | |
| 5,170,131 A | | 12/1992 | Takahiro et al. | |
| 5,276,705 A | * | 1/1994 | Higgins | ..................... 375/151 |
| 5,422,909 A | | 6/1995 | Love et al. | |
| 5,499,273 A | | 3/1996 | Kull et al. | |
| 5,696,797 A | * | 12/1997 | Bucher et al. | ............... 375/344 |
| 5,834,986 A | | 11/1998 | Myers | |
| 5,878,330 A | * | 3/1999 | Naumann | ..................... 455/71 |
| 5,963,589 A | * | 10/1999 | Nagano et al. | ............... 375/224 |
| 6,005,640 A | * | 12/1999 | Strolle et al. | ............... 348/726 |
| 6,298,100 B1 | * | 10/2001 | Bouillet | ..................... 375/326 |
| 6,356,598 B1 | * | 3/2002 | Wang | ..................... 375/321 |
| 6,421,099 B1 | * | 7/2002 | Oh | ..................... 348/732 |
| 6,430,243 B1 | * | 8/2002 | White | ..................... 375/376 |

FOREIGN PATENT DOCUMENTS

| | | |
|---|---|---|
| JP | 04-150440 | 5/1992 |
| JP | 08-506470 | 7/1996 |
| JP | 8-317009 | 11/1996 |
| JP | 11-136299 | 5/1999 |
| JP | 2001-515668 | 9/2001 |
| JP | 04-64834 | 2/2004 |
| WO | WO 98/24202 | 6/1998 |

OTHER PUBLICATIONS

Patent Abstracts of Japan for JP Publication No. 11–136299, published May 21, 1999 (English).
Patent Abstracts of Japan for JP Publication No. 04–150440, published May 22, 1992 (English).

* cited by examiner

Primary Examiner—Emmanuel Bayard
(74) Attorney, Agent, or Firm—Tarolli, Sundheim, Covell & Tummino L.L.P.

(57) ABSTRACT

A radio receiver (10) adapted to receive an AM-MSK modulated carrier signal includes an envelope detector (24) and a transformer (28) which restores the real signal to complex MSK format. A Doppler remover (34) removes any Doppler shift of the MSK due to relative motion of the transmitter and receiver (10). A sample rate reducer (56) may reduce the sample rate used in the Doppler remover (34) to the transmitted symbol rate used during the modulation process.

19 Claims, 1 Drawing Sheet

RADIO RECEIVER AM-MSK PROCESSING TECHNIQUES

BACKGROUND OF THE INVENTION

This invention relates to the processing of AM-MSK encoded radio signals, and more particularly relates to the conversion of such signals to MSK form.

Amplitude modulated minimum shift keying has been used in commercial airline radios to carry data at 2400 bits/sec for the ACARS net. This coding imposes frequency offset minimum shift keying (MSK) modulation which can be represented by real numbers at baseband frequencies on the envelope of an amplitude modulated (AM) carrier. The format for encoding MSK on AM was specifically developed for use with analog AM radios employing envelope detectors. One advantage of AM-MSK coding is the simplicity of demodulation. However, the demodulation recommended in current Federal Aeronautics Administration (FAA) descriptions is not optimal, because it does not provide ideal matched filtering. In addition, for a message length of several seconds, Doppler frequency shifts due to relative motion of vehicles carrying the radio and the ground station may interfere with the decoding of the symbols transmitted with AM-MSK coding. This invention addresses these problems and provides a solution.

Techniques for modulating a carrier signal to provide MSK encoded signals are described in U.S. Pat. No. 5,834,986 (Myers, issued Nov. 10, 1998), but this patent does not describe in detail the decoding of such signals. A synchronous receiver for minimum shift keying transmission is described in U.S. Pat. No. 4,942,592 (Leitch et al., issued Jul. 17, 1990). A demodulator for demodulating digital signals modulated by minimum shift keying is described in U.S. Pat. No. 5,170,131 (Takahiro et al., issued Dec. 8, 1992). None of these patents address the problems solved by the present invention.

BRIEF SUMMARY OF THE INVENTION

The preferred embodiment is useful in a radio receiver adapted to receive a radio carrier signal carrying a coded signal representing symbols coded at a predetermined symbol rate by amplitude modulated minimum phase shift keying. In such an environment, the preferred embodiment comprises an envelope arranged to remove the AM-MSK signal from the carrier and a transformer arranged to restore the AM-MSK coded signal into a baseband form of minimum shift keying (MSK) of the coded signal. By using these techniques, optimal match filter decoding of the AM-MSK is permitted.

According to another embodiment of the invention, when the carrier signal is shifted by a Doppler frequency, the preferred embodiment also comprises a phase locked loop Doppler canceller arranged to cancel the Doppler frequency from the MSK signal so that the decoding of the symbols is further improved.

By using the foregoing techniques, a radio receiver adapted to receive AM-MSK modulated signals transforms AM-MSK back to MSK format which provides improved sensitivity and noise performance.

DETAILED DESCRIPTION OF THE PREFERRED EMBODIMENTS

Figure 1:
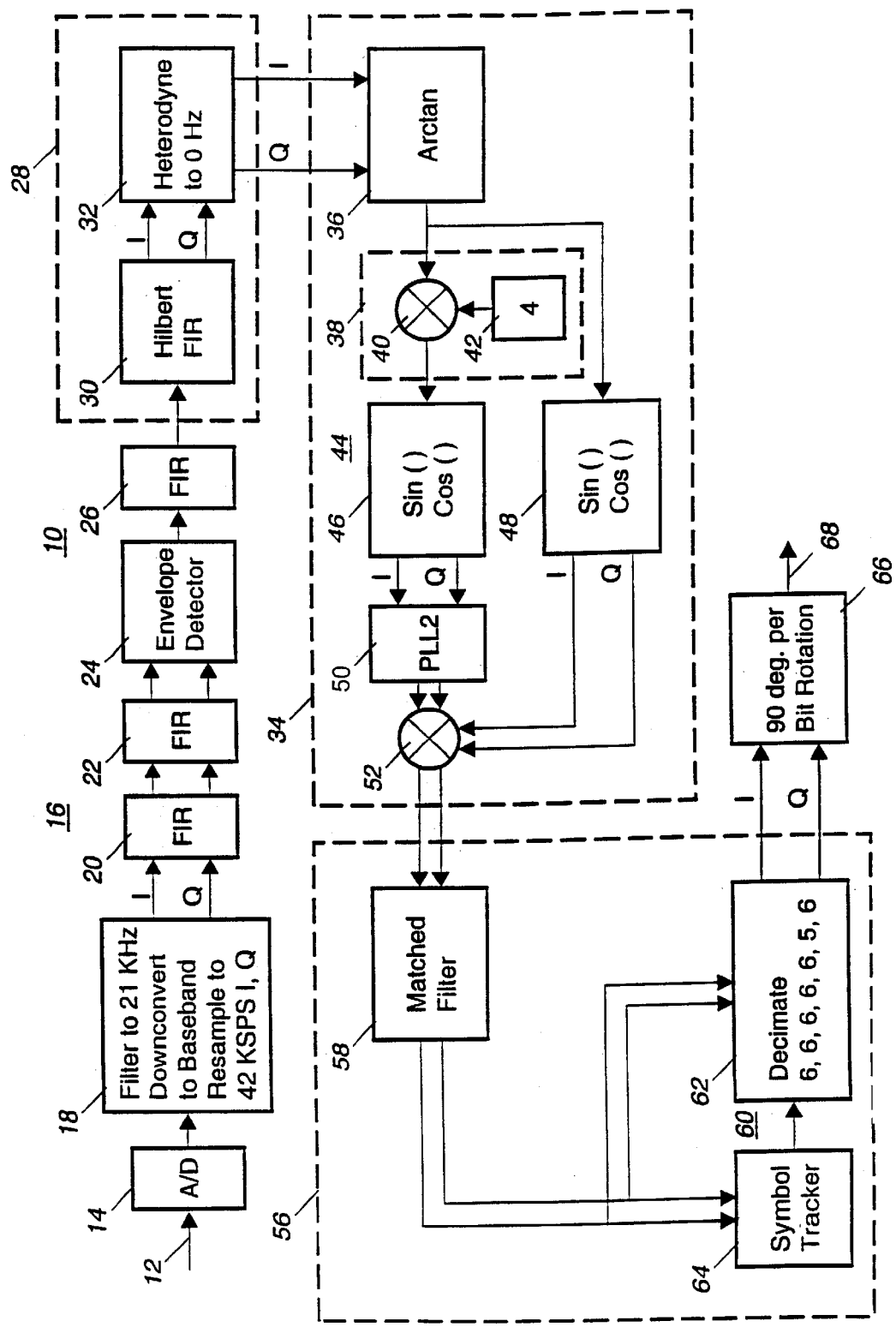
FIG. 1 is a schematic block diagram and flow diagram of a preferred form of apparatus and method made in accordance with the present invention.

Referring to FIG. 1, a preferred form of radio receiver 10 is adapted to receive a carrier signal carrying a coded signal representing symbols coded at a predetermined symbol rate by amplitude modulated minimum phase shift keying (AM-MSK). The symbol rate determined by the modulation specifications is 1200 symbols per second (SPS) which then provides 2400 bits per second (BPS). The carrier signal is received by a conventional antenna (not shown), and is down converted to an intermediate frequency (IF) carrier which still carries the AM-MSK modulation on the envelope. The IF carrier is received on an input 12 and is converted to digital form via a conventional analog to digital converter 14 operating at 50 million samples per second. The converted digital IF signal is received by a digital signal processor 16 which performs various operations described in the remaining blocks shown in FIG. 1. For example, in block 18, the processor filters the digital IF signal to plus or minus 21 KHz. The processor then down converts the IF digital signal to baseband frequency and resamples the baseband frequency to generate orthogonal I and Q signals at a rate of 42,000 samples per second. The processor also may perform data output buffering in operation 18.

The signal generated by operation 18 is converted in operation 20 to a floating point signal still having a rate of about 42,000 samples per second. The floating point signal then is processed by a finite impulse response (FIR) low pass filter 22 comprising ten taps which provides a 3 decibel attenuation at 8 KHz and an 80 decibel attenuation at 17 KHz. The signal is also decimated by 2 in filter 22.

The filtered signal then is processed by an envelope detector 24 which detects the AM-MSK modulation carried by the envelope of the carrier signal.

The output of envelope detector 24 is processed by a divide by three decimating 50 tap FIR filter 26 which provides a 3 decibel attenuation at 3 KHz and provides a 30 decibel attenuation at 3.5 KHz. The filter operates at 7,000 samples per second.

The filtered output next is processed by a transformer 28 comprising a Hilbert FIR filter which provides a 3 decibel attenuation at 300 Hz and a 30 decibel attenuation at 500 Hz. The Hilbert transformer transforms its single input into two complex baseband signals representing the offset I and Q components of MSK. The Hilbert transformed signal is processed by a heterodyner to 0 Hz operation 32 which restores the AM-MSK to a pure MSK waveform.

In summary, transformer 28 transforms the detected AM modulation into an offset MSK complex baseband signal which can then be heterodyned to zero frequency thereby restoring the waveform to pure MSK format.

The input carrier signal and baseband carrier signal typically are shifted by a Doppler frequency due to motion of the receiver or transmitter or both. Doppler frequency shifts typically occur when there is relative motion of the transmitting and receiving terminals, as on an air-to-ground link.

The output of hetrodyner 32 is processed by a Doppler remover or canceler 34 which cancels the Doppler frequency in the baseband signal in order to improve the decoding of the AM-MSK signals. Doppler remover 34 comprises a phase calculator in the form of an actangent calculator 36. The MSK phase modulation in the MSK coded signal is removed by an MSK component remover 38 comprising a multiplier 40 which multiplies the output of phase calculator 36 by the value 4 which is held in a register 42. The output of phase calculator 36 and multiplier 40 is transmitted to a transformer 44 comprising a first sine and cosine calculator 46 and a second sine and cosine calculator 48. Calculator 46 multiplies the output of multiplier 40 by a sine and cosine function to generate orthogonal I and Q signals at its output. Sine and cosine calculator 48 multiplies the output of phase calculator 36 (which still includes the MSK component) by a sine and cosine function to also generate complex baseband signals with I and Q components as its output.

The output of sine and cosine calculator 46 is processed by a phased lock loop 50 which tracks the phase of the signal processed by multiplier 40. Another multiplier 52 multiplies the value of the output of calculator 48 by the value of the output of the phase lock loop 50 so as to remove any Doppler frequency by which the baseband signal is shifted.

Both transformer 28 and Doppler remover 34 operate at about 7,000 samples per second. However, in order to provide optimum decoding of the symbols represented by the AM-MSK coding, the sample rate preferably is reduced to match the transmitted symbol rate of 1200 symbols per second. As a result, the output of multiplier 52 is processed by a sample rate reducer 56 comprising a matched filter 58 and a symbol tracker 60 which comprises a signal sampler in the form of a decimator 62 which passes every sixth sample for five cycles and then passes the fifth sample before beginning the cycle again. The symbol edges passed by decimator 62 are identified by a symbol tracker 64 which tracks the symbol center in order to identify the one sample out of six (or five) which is to be passed by decimator 62.

For decoding convenience, the output of decimator 62, which is operating at 1200 samples per second, may be processed by a 90 degree per bit rotator 66 which converts the MSK coding to binary phase shift keying (BPSK). The output of rotator 66 is transmitted to a decoder (not shown) by a conductor 68 at 2400 samples per second.

Those skilled in the art will recognize that the preferred embodiments described in the specification may be modified and altered without departing from the true spirit and scope of the invention as defined in the accompanying claims.

What is claimed is:

1. In a radio receiver adapted to receive a carrier signal carrying a coded signal representing symbols coded at a predetermined symbol rate by amplitude modulated minimum shift keying, apparatus for processing the coded signal comprising:
    a detector arranged to detect the coded signal; and
    a transformer arranged to transform the detected coded signal into two complex baseband signals representing offset minimum phase shift keying of said coded signal,
    wherein said apparatus comprises a digital processor and wherein said detector and transformer comprise portions of an algorithm executed by said digital processor,
    wherein said carrier signal frequency is shifted by a Doppler frequency and further comprising a Doppler canceler arranged to cancel said Doppler frequency shift from said MSK baseband signal,
    wherein said Doppler canceler comprises a portion of an algorithm executed by said digital processor:
    a phase calculator arranged to calculate the phase represented by said complex baseband signal;
    a phase modulation component remover;
    a second transformer arranged to generate a second complex baseband signal in response to the output of the phase calculator and a third complex baseband signal in response to the output of the phase modulation component remover; and
    a multiplier responsive to the values represented by the second and third complex baseband signals.

2. Apparatus, as claimed in claim 1, wherein said transformer comprises a Hilbert transformer and a heterodyner arranged to transform offset MSK to MSK.

3. Apparatus, as claimed in claim 1, wherein said phase modulation component remover comprises a second multiplier arranged to multiply the output of the phase calculator by four and a phase locked loop arranged to track said phase of said third complex baseband signal.

4. Apparatus, as claimed in claim 3, wherein said phase calculator comprises an arctangent calculator responsive to said complex baseband signal.

5. Apparatus, as claimed in claim 4, wherein said second transformer comprises:
    a first sine and cosine calculator arranged to multiply the output of the phase calculator by a sine and cosine function to generate the second complex baseband signal; and
    a second sine and cosine calculator arranged to multiply the output of the second multiplier by a sine and cosine function to generate the third complex baseband signal.

6. Apparatus, as claimed in claim 1, wherein said Doppler remover operates at a sample rate greater than said symbol rate which is a non-integer multiple of the symbol rate and further comprising a sample rate reducer responsive to the output of said Doppler canceler to reduce the sample rate to said symbol rate.

7. In a radio receiver adapted to receive a carrier signal carrying a coded signal representing symbols coded at a predetermined symbol rate by amplitude modulated minimum shift keying, apparatus for processing the coded signal comprising;
    a detector arranged to detect the coded signal; and
    a transformer arranged to transform the detected coded signal into two complex baseband signals representing offset minimum phase shift keying of said coded signal,
    wherein said apparatus comprises a digital processor and wherein said detector and transformer comprise portions of an algorithm executed by said digital processor,
    wherein said carrier signal frequency is shifted by a Doppler frequency and further comprising a Doppler canceler arranged to cancel said Doppler frequency shift from said MSK baseband signal,
    wherein said Doppler remover operates at a sample rate greater than said symbol rate which is a non-integer multiple of the symbol rate and further comprising a sample rate reducer responsive to the output of said Doppler canceler to reduce the sample rate to said symbol rate
    wherein said sample rate reducer comprises:
        a sampler arranged to selectively pass samples of the complex baseband signal; and
        a symbol edge tracker arranged to identify the samples to be passed by said sampler.

8. Apparatus, as claimed in claim 7, wherein the sampler comprises a decimator.

9. Apparatus, as claimed in claim 8, wherein said sample rate reducer further comprises a matched filter responsive to the output of said Doppler canceler.

10. In a radio receiver adapted to receive a carrier signal carrying a coded signal representing symbols coded at a predetermined symbol rate by amplitude modulated minimum shift keying, a method of processing the coded signal comprising:
    detecting the coded signal;

transforming the detected coded signal into two complex baseband signals representing the minimum phase shift keying component of said coded signal without the amplitude modulation component of said coded signal, wherein said detecting and transforming comprise digital processing, wherein said carrier signal frequency is shifted by a Doppler frequency and further comprising canceling said Doppler frequency shift from said complex baseband signals operating at a sample rate greater than said symbol rate which is a non-integer multiple of the symbol rate;

reducing the sample rate to said symbol rate by identifying samples to be passed; and selectively passing the identified samples of the complex baseband signal.

11. A method, as claimed in claim 10, wherein said transforming comprises Hilbert transforming and heterodyning to restore AM-MSK to MSK format.

12. In a radio receiver adapted to receive a carrier signal carrying a coded signal representing symbols coded at a predetermined symbol rate by amplitude modulated minimum shift keying, a method of processing the coded signal comprising:

detecting the coded signal; and transforming the detected coded signal into two complex baseband signals representing the minimum phase shift keying component of said coded signal without the amplitude modulation component of said coded signal wherein said detecting and transforming comprise digital processing, wherein said carrier frequency is shifted by a Doppler frequency and further comprising canceling said Doppler frequency from said complex baseband signal, wherein said canceling comprises digital processing;

calculating the carrier phase represented by said complex baseband signals;

removing said minimum shift keying phase modulation component from said calculated phase to generate a carrier reference signal;

generating a second complex baseband signal in response to the shift keying included signal;

generating a third complex baseband signal in response to the shift keying removed signal; and multiplying the values represented by the second and third complex baseband signals.

13. A method, as claimed in claim 12, wherein said removing comprises:

multiplying the phase by four to generate an unmodulated phase reference signal; and tracking said phase reference to determine the phase and frequency of the received carrier.

14. A method, as claimed in claim 13, wherein said calculating said phase comprises calculating an arctangent.

15. A method, as claimed in claim 14, wherein said generating said second complex baseband signal comprises multiplying said phase by a sine and cosine function and wherein said generating said third complex baseband signal comprises multiplying said shift keying removed signal by a sine and cosine function.

16. A method, as claimed in claim 12, wherein the digital processing step of removing operates at a sample rate greater than said symbol rate and further comprising reducing the sample rate to said symbol rate after removing said Doppler frequency.

17. A method, as claimed in claim 16, wherein said reducing said sample rate comprises:

passing samples in response to said Doppler frequency removed complex baseband signal; and identifying the samples to be passed by tracking the phase of said Doppler frequency removed complex baseband signal.

18. A method, as claimed in claim 17, wherein the sampling comprises decimating.

19. A method, as claimed in claim 18, wherein said reducing said sample rate further comprises matched filtering in response to said Doppler frequency removed complex baseband signal.

* * * * *